April 26, 1966 — R. A. DEHN — 3,248,596

MULTIPLE-BEAM KLYSTRON TUNING MEANS

Filed Feb. 16, 1962 — 2 Sheets-Sheet 1

Inventor:
Rudolph A. Dehn,
by Philip L. Schlamp
His Attorney.

Inventor:
Rudolph A. Dehn,
by Philip L. Schlamp
His Attorney.

United States Patent Office 3,248,596

Patented Apr. 26, 1966

3,248,596

MULTIPLE-BEAM KLYSTRON TUNING MEANS

Rudolph A. Dehn, Schenectady, N.Y., assignor to General Electric Company, a corporation of New York Filed Feb. 16, 1962, Ser. No. 173,704

7 Claims. (Cl. 315—5.16)

This invention relates to multiple-beam radio frequency (R.F.) apparatus capable of generating and handling relatively high electromagnetic wave power at relatively high frequencies and more particularly to new and improved means for tuning such apparatus.

In copending U.S. application S.N. 173,724 M. R. Boyd et al. filed concurrently herewith and assigned to the same assignee as the present invention, there is disclosed and claimed multiple-beam R.F. apparatus which is particularly adapted for generating and handling substantially high electromagnetic wave power at microwave frequencies and in a manner effective for minimizing mode interference problems of the type theretofore encountered in multiple-beam devices. Also, the mentioned apparatus is adapted for generating and handling power levels equivalent to the total power of a plurality of individual single-beam radio frequency power generating devices which capability had not been accomplished with prior multiple-beam devices.

The present invention contemplates the provision of radio frequency apparatus of the above-discussed type and incorporating new and improved means whereby the frequency-determining characteristics of resonator sections of the apparatus can be readily and selectively varied over a predetermined range, thereby to adapt the various sections of the device for being easily tunable to any desired operating frequencies within the predetermined ranges. The present invention also contemplates structure whereby such tuning is attainable without degrading or adversely affecting the above-mentioned desirable operating capabilities of the apparatus.

It is, accordingly, an object of this invention to provide new and improved multiple-beam radio frequency apparatus incorporating new and improved frequency tuning means.

It is another object of this invention to provide in multiple-beam radio frequency apparatus adapted for high power operation and minimal mode interference difficulties, new and improved means for affording tuning of the apparatus without adversely affecting the mode spacings and electromagnetic field patterns in the apparatus, whereby the desired high-power and minimal mode interference operation is attained.

Further objects and advantages of this invention will become apparent as the following description proceeds and the features of novelty which characterize this invention will be pointed out with particularity in the claims annexed to and forming part of this specification.

In carrying out the objects of this invention, and according to one embodiment thereof, there is provided multiple-beam radio frequency apparatus comprising input, output, and preferably at least one intermediate, longitudinally-resonant waveguide supported in spaced parallel relation. Extending perpendicular to and in operative association with the waveguides are a plurality of parallel klystron-like beam devices. Each of such devices includes a plurality of axially-spaced drift tubes defining input, output, and one or more intermediate, capacitive interaction gaps located in respective ones of the mentioned waveguides, an electron gun for projecting a beam of electrons through the drift tubes past the interaction gaps and a collector for collecting the electrons emerging from the last drift tube. In each waveguide the interaction gaps defined by the opposite ends of adjacent drift tubes comprise equally-spaced active capacitive elements. Also, in each waveguide and interposed midway between each pair of active elements there is provided a passive, or dummy, capacitive element having a capacitance value substantially equal to that of an active element. Further, the periodic electrical spacing between adjacent capacitive elements and between the outermost capacitive elements and adjacent end walls in each waveguide is made equal to ¼ of the loaded guide wavelength at a predetermined operating frequency. Suitable means is provided for exciting the input waveguide to establish therein a standing electromagnetic wave of the afore-mentioned frequency which results in the occurrence of an electric field maximum at each active capacitive element in the input waveguide and a voltage node at each passive element. Thusly, and in accordance with the invention of the above-mentioned Boyd et al. application, the apparatus is adapted for cooperative maximum-efficiency energy exchange between the wave in the input section and all of the beams passing therethrough for effecting velocity modulation of the beams which results in the beams becoming density-modulated in the subsequent field-free drift regions. The density-modulated beams cooperatively excite similar standing waves in the intermediate waveguides which results in further density modulation of the beams in subsequent drift regions and, finally, the density-modulated beams cooperatively, and with maximum efficiency energy exchange, induce a corresponding amplified electromagnetic wave in the output waveguide wherein the electric field maxima occur at the active gaps and voltage nodes of the passive elements. The electromagnetic wave energy is extracted from the output waveguide by any suitable means. In order to tune the apparatus to operate at different selective frequencies the apparatus includes, according to the present invention, tuning means in each waveguide adapted for affecting the frequency-determining characteristics thereof without distorting the mode spacings and electromagnetic field patterns in the waveguides, whereby the desired mode separation and maximum-efficiency energy exchange between the waves and beams are attained. Specifically, the tuning means comprise a conductive sidewall member extending in each waveguide along either or both sidewalls thereof and being adjustably moveable relative to the array of capacitive elements over a predetermined range and in a direction normal to the axis of the waveguides. The moveable conductive members are electrically connected to the top and bottom walls, preferably, but not necessarily, the end walls, of the waveguides in any suitable manner, such as by convoluted metal strips or sliding finger contacts. The movements of the conductive members adjustably vary the widths of the waveguides whereby the frequencies of the standing electromagnetic waves therein are correspondingly changed. Means can be included for simultaneously adjustably positioning the tuning members of a plurality of waveguides for thus simultaneously varying the frequencies of the waves therein. Thus, frequency of operation of the resonant waveguides, and, accordingly, of the overall apparatus, can thereby be selectively controlled over a predetermined frequency range. The apparatus can comprise a unitary structure wherein the waveguides and beam devices comprise sections of a single evacuated assembly in which case the tuning members can be adjustively manipulated through flexible means hermetically sealed in the sides of the waveguides. Alternatively, the waveguides and beam devices can comprise separate subassemblies with the waveguides constructed to carry the passive elements and tuning members therein and having sockets for receiving detachable discrete evacuated klystron-like beam devices. In such an arrangement, of course, the waveguides would not be evacuated and no hermetic seals would be required for the tuning means.

For a better understanding of the invention reference may be had to the accompanying drawing in which.

Figure 1:
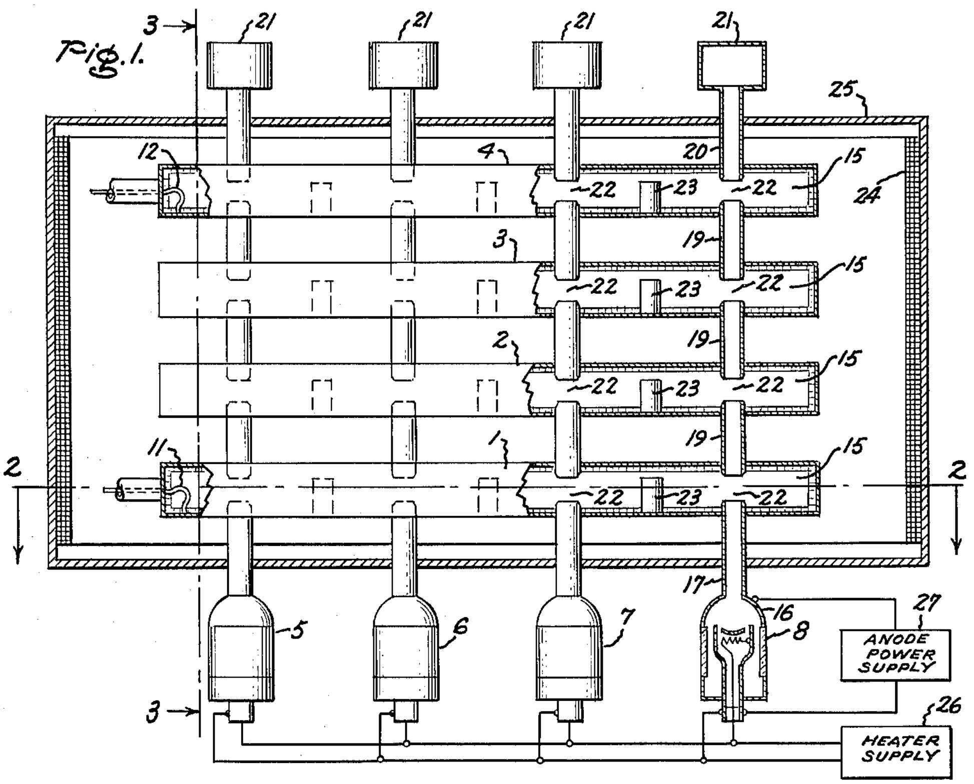
FIGURE 1 is a sectional view of a multiple-beam electric discharge device constructed according to one embodiment of the invention.

Referring now to FIGURE 1, there is shown multiple-beam radio frequency amplifying apparatus constructed in accordance with the invention. More specifically, the arrangement of FIGURE 1 is an electric discharge device in which D.C. energy from four electron beams is converted into electromagnetic wave energy having substantially the same power generating and handling capacities of a single-beam klystron of comparable dimensions and which is adapted for being frequency-tuned over a predetermined operating bandwidth without adversely affecting the mentioned power generating and handling capabilities. However, from the outset, it is to be understood that the effect of the tuning arrangement herein disclosed can be used with multiple-beam devices having more or less than four electron beams.

The device of FIGURE 1 is constructed as a unitary evacuated envelope comprising four longitudinally resonant waveguides designated 1–4 arranged in spaced parallel relation and a plurality of transversely extending equally-spaced cooperating klystron-like beam devices designated 5–8. In this arrangement, and according to the invention of the above-referenced Boyd et al. application, each of the waveguides 1–4 is a short-circuited or longitudinally resonant section of a periodically loaded waveguide. The waveguides are preferably rectangular in cross-section as shown; however, it is to be understood and will be appreciated from the following disclosure, that the invention is not limited to use of waveguides of this particular cross-sectional configuration.

Figure 2:
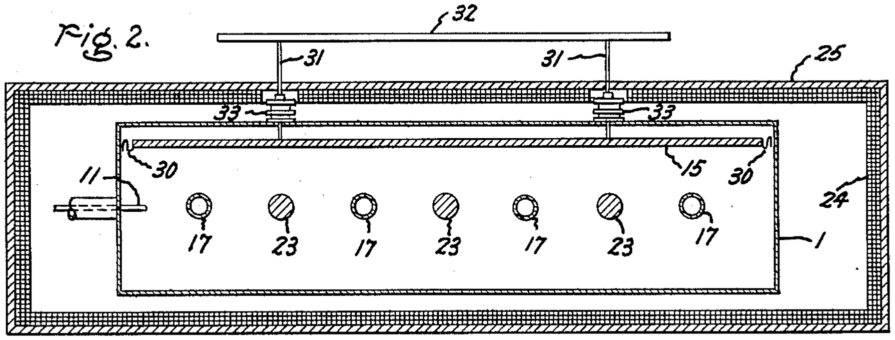
FIGURE 2 is a sectional view taken along the lines 2—2 in FIGURE 1 and looking in the direction of the arrows.

The lowermost waveguide 1 in FIGURE 1 constitutes an input resonator and is adapted to be excited for having a standing electromagnetic wave established therein by any suitable radio frequency input coupling means, such as an inductive coupling loop 11. In a manner generally similar to that well known in the klystron art, the input resonator is effectively employed to velocity-modulate the beams of the devices 5–8. The uppermost waveguide 4 in FIGURE 1 constitutes an output resonator and is adapted for having an amplified electromagnetic wave induced therein. Energy is extracted from the output resonator by any suitable radio frequency output means such as an inductive loop 12. Interposed between the input and output resonators 1 and 4 are intermediate resonators 2 and 3 which are shown as two in number but which can be employed in any desired number, which intermediate resonators serve to increase beam modulation and bunching efficiency in generally the same well known manner as intermediate resonators found in the klystron art. The frequency characteristics of each of the resonators 1–4 is selectively variable in accordance with the present invention by means of adjustably positionable conductive sidewall tuning members 15 which, as seen in FIGURES 1 and 2, each extend parallel to a sidewall of each waveguide 1–4. In order to bring out clearly the structure and function of the tuning members 15 the overall device will now be described in detail.

The beam devices 5–8 each comprise a gun section 16 including a tubular section 17 sealed and extending reentrantly in one side of the input resonator 1 and an emitter generally designated 18 adapted for directing a beam of electrons axially through the section 17. Axially aligned with each section 17 are a plurality of drift tubes 19, and axially aligned therewith and extending from the output resonator 2 is a tubular section 20 connected to a collector 21. In the described arrangement the tubular sections 17 and 20 and drift tubes 19 extend reentrantly in the several resonators to define therein reentrant active capacitive gaps, or elements, designated 22 which have uniform capacitive values across each waveguide. As seen in FIGURE 1, and in accordance with the mentioned Boyd et al. invention, the active gaps 22 are periodically, or uniformly, spaced along each waveguide. Also, in accordance with the mentioned Boyd et al. invention there is provided midway between each pair of adjacent active gaps in each resonator a passive, or dummy, capacitive element 23 having a capacitance value substantially the same as the capacitance value of the active gaps, and the outer most gaps 22 are spaced from the end walls of the resonators an amount equal to the spacing between the active and passive gaps.

The described device is surrounded by a solenoid coil 24 which provides a collimating magnetic field extending parallel to the axes of the beam devices and adapted for focussing several electron beams therein. The entire assembly is enclosed by a casing 25 formed, for example, of a material effective to provide uniformity of the axial magnetic field in the region through which the electron beams pass. The electron guns 18 can be supplied with operating potentials from any suitable sources indicated by 26 and 27 and which are well-known to those skilled in the art.

In the operation of the above-described device a standing electromagnetic wave is established in each waveguide resonator. Also, in each resonator and at a predetermined operating center frequency the electric field maxima occur at each of the active gaps 22 and electric field minima, or nodes, occur at each of the passive gaps and at each of the waveguide end walls. This results in maximum frequency separation between the desired $\pi/2$ mode and adjacent undesired modes. Previous multiple-beam devices have not employed this arrangement of periodic capacitances and, thus, were not adapted for satisfactory mode separation.

The present invention provides for frequency tuning of the described device without degrading the above-discussed desirable operating capabilities of a multiple-beam klystron and includes the mentioned sidewall tuning members 15. Specifically, and as seen in FIGURES 1–4, each of the waveguides 1–4 is provided with an elongated plate-like conductive tuning member 15 extending parallel to a sidewall of the waveguide. The members 15 are each moveable in a direction normal to the longitudinal axes of the resonators and extend substantially the full lengths of the waveguides and from the top to the bottom walls of each waveguide. Electrical contact between the movable tuning members 15 and the walls of the resonators can be effected in any suitable manner, such as by the provision of convoluted, or S-shaped, metal straps, best shown in FIGURE 4. Alternatively, such electrical contact can be made by sliding finger contacts, by a choke joint or by any other suitable means effective for avoiding R.F. energy leakage past the members 15. Additionally, the movement of the members 15 in a direction normal to the axes of the waveguides, or so as to continue parallel to the axes of the waveguides, insures variance of the waveguide volume uniformly along the length of the waveguide. Thus, each member 15, in effect, constitutes a sidewall of its respective waveguide and is moveable over a predetermined range of distances between the opposite side walls for varying the internal volume of the waveguide and is adapted for having established therein a standing wave which cooperates in energy interchange relation with the beams. This has the effect of varying adjustably over a predetermined range the frequency-determining characteristics of the waveguide uniformly along the length thereof and avoids undesired distortion of the filled patterns in the waveguide. Thus, tuning of the various resonant sections of the device can be accomplished without distorting the field patterns which afford the above-discussed desired maximum-efficiency energy exchange between the electromagnetic waves in the waveguides and the traversing beams and in a manner which does not adversely affect the desired mode separation above-discussed.

The movement of the tuning member 15 in a direction normal to the waveguide axes can be accomplished by means of a pair of spaced plunger rods 31 which can, if desired, be connected to a common member 32 provided to facilitate accurate uniform translatory movement of the member 15 in the waveguide. Flexible vacuum seals 33 maintain the vacuum within the resonators by providing hermetic seals between the plunger rods 31 and the walls of the resonators. Alternatively, the S-shaped straps 30 can be hermetically joined between the upper, lower and end walls of the waveguide and the sidewall members 15 to provide for vacuum tightness of the waveguides if desired.

Figure 3:
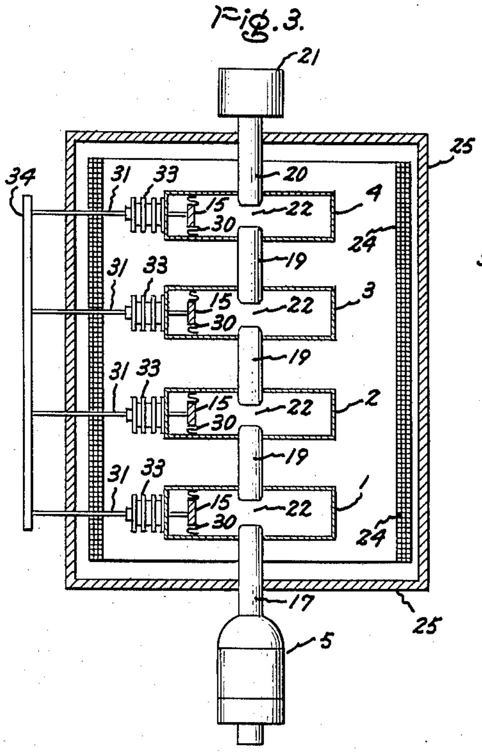
FIGURE 3 is a sectional view taken along the lines 3—3 in FIGURE 1 and looking in the direction of the arrows.

A separate member 32 can be provided for independently adjustably moving the tuning members 15 in each of the waveguides 1–4. However, as seen in FIGURE 3, and if desired, gang tuning of all, or a plurality less than all, of the resonators can be accomplished by the provision of a single common actuating member 34 having the plungers 31 of all, or a plurality of less than all, of the various members 15 secured thereto.

Figure 5:
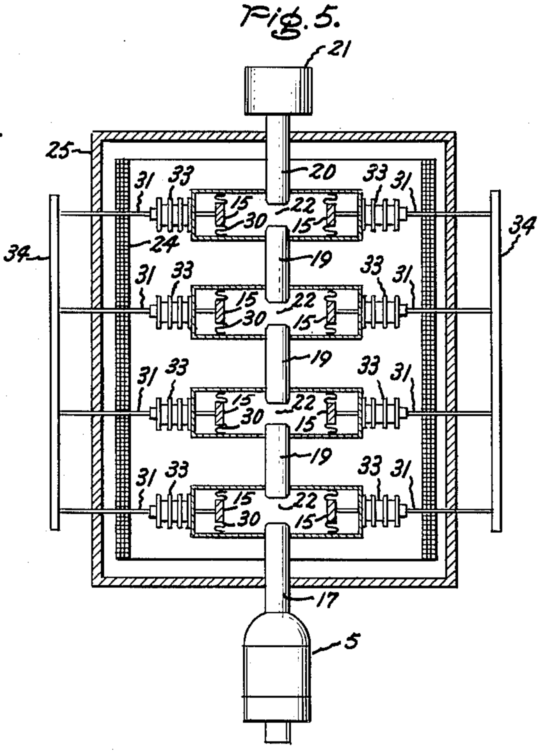
FIGURE 5 is a sectional view of a modified form of the present invention incorporating tuning means on both sides of each waveguide.
Figure 4:
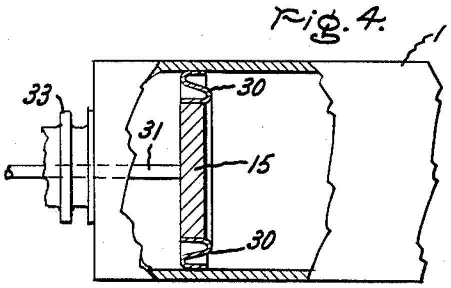
FIGURE 4 is a fragmentary enlarged sectional view illustrating the tuning means in detail.

Illustrated in FIGURE 5 is a second embodiment of the invention which can be identical to the embodiment of FIGURES 1–4 except for the further provision of a second tuning member 15 in each waveguide. In this embodiment also plunger rods 31 facilitate the movement of moveable elongated plate-like tuning members 15 over a predetermined range and vacuum seals 33 maintain a vacuum within the resonators 1–4. Common actuators 34 can be provided to facilitate simultaneous, or gang, tuning of a plurality of the resonators. In other respects the structure of FIGURE 4 can be identical structurally and functionally to the first-described device.

The operation of the apparatus of both of the described embodiments and the advantages of the present invention may be better understood from a discussion of the propagation and wave-supporting characteristics of the periodically-loaded waveguides provided in the above-described structures. An electromagnetic wave in either of the resonators 1–4 is presented with periodically arranged capacitances in the forms of active and passive capacitances in accordance with the mentioned invention of Boyd et al. Thus, each of the resonators 1–4 is, in effect, an electrically-shorted section of a periodically-loaded waveguide.

Figure 6:
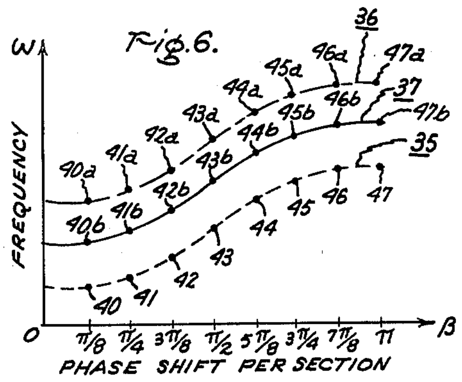
FIGURE 6 is an $\omega\beta$ diagram showing the relations between the resonant frequencies of the device of FIGURE 1 and different positions of the moveable tuning members.

FIGURE 6 is an $\omega$-$\beta$ diagram and shows the graphical relation of the phase shift per section of a matched periodically-loaded waveguide as a function of the frequency of an electromagnetic wave within such a waveguide for three different positions of the moveable tuning members 15 of the invention. As seen in FIGURE 6 at each tuner position the loaded waveguide has a low limit frequency, or lower cut-off frequency, below which energy can not be propagated therethrough. As the frequency increases above the lower cut-off frequency, propagation becomes possible; and if the frequency is continuously increased above cut-off, a frequency will ultimately be reached where the spacing between adjacent periodic capacitances in the periodically-loaded waveguide becomes equal to ½ of a waveguide wavelength. At this frequency, the phase shift between adjacent capacitances is equal to $\pi$ radians. The reflection from a capacitance then reinforces the reflection from the immediately preceding periodic capacitance and the overall effect in a long waveguide is total reflection and no propagation. The matched periodically-loaded waveguide thus serves as a band-pass filter for frequencies between these upper and lower cut-off frequencies. The matched periodically-loaded waveguide also has pass bands and stop bands at higher frequencies, but they are of no interest for the present discussion.

In FIGURE 6 are illustrated three $\omega$-$\beta$ diagrams with the diagram designated 35 representing the characteristics of a waveguide constructed according to the present invention and when a moveable tuning member 15 therein is positioned at its maximum distance from the longitudinal axis of the resonator, whereby the lower cut-off frequency of the resonator is at a minimum, the diagram 36 representing the characteristics of the waveguide where the moveable member 15 is extended to its maximum position within the waveguide, whereby the lower cut-off frequency of the resonator is at a maximum and the diagram 37 representing the characteristics of the waveguide when the moveable member 15 is positioned at an intermediate position. Thus, it is to be seen that the position of the pass band of each of the resonators can be varied over a predetermined frequency range by positioning the movable member 15 therein in predetermined locations.

While the matched periodially-loaded waveguides may support an electromagnetic wave having a frequency of any value within the pass bands, an additional limitation exists when the periodically-loaded waveguides are made resonant by terminating the ends in short circuits, as is the case with resonators 1–4. Resonance occurs in the short circuited, periodically-loaded waveguides only at those frequencies at which the structure is an integral number of loaded-guide half wavelengths long, and in such waveguides, the total phase shift along the guides must thus be an integral multiple of $\pi$. In other words, resonance occurs only at frequencies at which the difference in phase of the wave at two adjacent impedances is $\pi n/N$ where N is the number of sections into which the line is divided by the periodic capacitances and $n$ is an integer in the interval between $n=1$ and $n=N$. Thus, when the moveable tuning member 15 is fully extended away from the longitudinal axis of one of the resonators 1–4, the latter is capable of supporting electromagnetic waves only of the frequencies indicated at positions 40, 41, 42, 43, 44, 45, 46 and 47 on $\omega$-$\beta$ diagram 35 of FIGURE 6, with each of these frequencies having a phase shift per section of $\pi/8$, $\pi/4$, $3\pi/8$, $\pi/2$, $5\pi/8$, $3\pi/4$, $7\pi/8$ and $\pi$, respectively. It is to be noted that all of these frequencies lie between the lower cut-off frequency of the first pass band of the periodically loaded waveguide.

In a similar manner, when the moveable tuning member 15 is fully extended toward the longitudinal axis of a resonator, the resonator is capable of supporting electromagnetic waves only at the frequencies indicated by positions 40*a*, 41*a*, 42*a*, 43*a*, 44*a*, 45*a*, 46*a* and 47*a* of $\omega$-$\beta$ diagram 37, and when the moveable tuning member 15 is located at an intermediate position corresponding to $\omega$-$\beta$ diagram 36, the resonators are capable of supporting electromagnetic waves only of the frequencies indicated at positions 40*b*, 41*b*, 42*b*, 43*b*, 44*b*, 45*b*, 46*b* and 47*b*.

It is known in the klystron art that maximum energy transfer between an electromagnetic wave and an electron beam occurs when the electron beam sees the greatest possible integrated electric field when passing through the interaction gap of the klystron. As pointed out above, and in accordance with the teaching of Boyd et al. in the above-mentioned application, in the described periodically-loaded structures maximum frequency separation of adjacent modes is obtained at $\pi/2$ operation. In this regard it is to be noted that the desired $\pi/2$ operation with this desired operational advantage is essentially the same for all adjustive positions of the tuning member 15. That is, in each of the adjusted positions of the tuning member 15 characterized by the $\omega$-$\beta$ curves 35–37 maximum frequency separation of adjacent modes occur at $\pi/2$ operation. Thus, it can be seen from the foregoing that the present tuning arrangement provides for frequency tuning over a predetermined tuning range without degrading the frequency separation of adjacent modes. Also, the arrangement provides for frequency tuning over a predetermined tuning range without distorting the field patterns in the waveguides which dispose the field maxima at the active gaps for obtaining maximum energy exchange between the beams and electromagnetic waves and which are obtained through the Boyd et al. teaching of periodic loading of the waveguides with alternate active and capacitive gaps. However, it is to be further understood that while the present invention is adapted for avoiding degrading effects on the desirable $\pi/2$ mode of operation of a multiple-beam device the practice of the invention is not limited to devices which are operating at the $\pi/2$ mode, but an equal range of attainable frequencies can be obtained at any mode in which the device is capable of operating.

Also, as indicated above, the present invention is not limited to unitary evacuated devices such as the types illustrated in the drawing. The invention is equally applicable to apparatus such as that disclosed as the second embodiment in the mentioned Boyd et al. application and wherein the beam devices and waveguide resonators comprise discrete subassemblies with the beam devices detachably mounted in, or coupled to, the waveguide sections. In such an arrangement the tuning members and the passive capacitive elements would be mounted in the waveguide sections.

Further, the present invention is not limited to apparatus wherein the active capactive gaps comprise the interaction gaps of beam-type devices. The present concept of tuning a waveguide resonator periodically-loaded with active and passive capacitive gaps is applicable also to apparatus wherein other types of active gaps are employed, such, for example, as the apparatus disclosed and claimed in copending U.S. application S.N. 173,703 of the present inventor filed concurrently herewith and assigned to the same assignee as the present invention and wherein space charge control devices are employed.

What is claimed as new and desired to be secured by Letters Patent of the United States is:

1. In a multiple beam radio frequency apparatus including a longitudinally-resonant waveguide periodically-loaded by a longitudinally-extending array of alternate active and passive capacitive elements of comparable values, the active elements constituting interaction gaps, and means for establishing in said waveguide a standing electromagnetic wave having electric field maxima occurring at each said active elements and minima at said passive elements therein for effecting maximum-efficiency energy exchange between said electrons and said wave and maximum mode separation, the improvement comprising means including a conductive member extending longitudinally along said wave guide and extending along the side of a plurality of said active and said passive capacitive elements, said conductive member being moveable relative to said array of capacitive elements to vary the resonant-frequency-determining characteristics of said waveguide without degrading the efficiency of said energy exchange and said maximum mode separation.

2. Radio frequency apparatus according to claim 1, wherein a conductive member extends along each longitudinally-extending sidewall of said waveguide and on opposite sides of a plurality of said active and passive capacitive elements and are moveable relative to said array of capacitive elements.

3. Radio frequency apparatus according to claim 1, wherein said conductive member comprises an elongated conductive plate-like element which is equidistantly moveable relative to said array of capacitive elements and has the marginal regions thereof electrically contacting the adjacent walls of said waveguide.

4. In a multiple beam radio frequency apparatus including at least a pair of spaced longitudinally-resonant waveguides each periodically loaded by a longitudinally-extending array of alternate active and passive capacitive elements of comparable values, the active elements of each waveguide constituting interaction gaps and being aligned with respective elements of the other waveguide, and means for establishing in one said waveguide a standing electromagnetic wave having electric field maxima occurring at each said active elements and minima at each said passive elements therein, and means directing electrons successively across the respective gaps of first said one and then the other waveguide, whereby an amplified electromagnetic wave is induced in said other waveguide corresponding to said wave in said one waveguide and having electric field maxima and minima occurring, respectively, and at said active and passive elements, means for extracting radio frequency energy from said other waveguide, the improvement comprising means including at least one member extending along a sidewall of each said waveguides and being movable relative to said array of capacitive elements therein for varying the resonant-frequency-determining characteristics of said waveguides.

5. Radio frequency apparatus according to claim 4, and further comprising means for simultaneously moving said movable members for simultaneously varying the resonant frequency-determining characteristics of said waveguides.

6. Radio frequency apparatus comprising at least a pair of spaced longitudinally-resonant waveguides each being periodically loaded by a longitudinally-extending array of several active capacitive elements and passive capacitive elements of substantially equal values positioned midway between said active elements, the active elements of each waveguide constituting interaction gaps and being aligned with respective elements of the other waveguide, means for establishing in one of said waveguides a standing electromagnetic wave having electric field maxima occurring at each said active elements and minima at each said passive elements therein, means for projecting discrete electron beams across said interaction gaps in first said one waveguide and then the other said waveguides and including drift space defining means located along said beams between said interaction gaps, whereby an amplified electromagnetic wave is induced in said other waveguide corresponding to said wave in said one waveguide and having electric field maxima and minima occurring respectively, at said active and passive elements, means for extracting radio frequency energy from said other waveguide and at least one of said waveguides having at least one longitudinally-extending sidewall adjustably movable normal to the longitudinal axis of said waveguide for predeterminedly varying the resonant-frequency-determining characteristics of said waveguide.

7. Radio frequency apparatus comprising at least a pair of spaced longitudinally-resonant waveguides each being periodically loaded by a longitudinally-extending array of several active capacitive elements and passive capacitive elements of comparable values positioned midway between said active elements, the active elements of each waveguide constituting interaction gaps and being aligned with respective elements of the other waveguide, means for establishing in one of said waveguides a standing electromagnetic wave having electric field maxima occurring at each said active elements and minima at each said passive elements therein, means for projecting discrete electron beams across said interaction gaps in first said one waveguide and then the other said waveguides and including drift space defining means located along said beams between said interaction gaps, whereby an amplified electromagnetic wave is induced in said other waveguide corresponding to said wave in said one waveguide and having electric field maxima and minima occurring, respectively, at said active and passive elements, means for extracting radio frequency energy from said other waveguide, and at least one of said waveguides having both the longitudinally-extending sidewalls being adjustably movable normal to the longitudinal axis of said waveguide for predeterminedly varying the resonant-frequency-determining characteristics of said waveguide.

References Cited by the Examiner

UNITED STATES PATENTS

| | | | |
|---|---|---|---|
| 2,353,742 | 7/1944 | McArthur | 315—5.16 |
| 2,458,556 | 1/1949 | Bowen | 315—5.46 X |
| 2,657,329 | 10/1953 | Wathen | 315—5.29 X |
| 2,860,280 | 11/1958 | McArthur | 333—83 X |
| 2,910,614 | 10/1959 | Bondley | 333—83 X |
| 2,920,229 | 1/1960 | Clarke | 315—5.16 |
| 3,064,158 | 11/1962 | Buck | 333—83 X |

HERMAN KARL SAALBACH, *Primary Examiner.*

GEORGE N. WESTBY, *Examiner.*

S. CHATMON, E. LIEBERMAN, *Assistant Examiners.*